United States Patent

Jankura et al.

Patent Number: 5,168,065
Date of Patent: Dec. 1, 1992

[54] FORCED OXIDATION MONITORING AND CONTROL SYSTEM

[75] Inventors: Bryan J. Jankura, Mogadore; Dennis W. Johnson, Barberton; Michael G. Milobowski, Canton, all of Ohio

[73] Assignee: The Babcock & Wilcox Company, New Orleans, La.

[21] Appl. No.: 799,502

[22] Filed: Nov. 27, 1991

[51] Int. Cl.⁵ .............. G01N 35/00; B01J 10/00
[52] U.S. Cl. .................... 436/55; 436/119; 436/163; 422/62; 422/105; 422/108; 422/111; 423/243.01; 423/555
[58] Field of Search ........... 436/55, 163, 119, 122; 422/62, 88, 98, 105, 108, 111, 172; 423/242, 555

[56] References Cited

U.S. PATENT DOCUMENTS

| | | | |
|---|---|---|---|
| Re. 28,864 | 6/1976 | Andral et al. | 436/55 |
| 4,239,493 | 12/1980 | Niemi et al. | 436/55 |
| 4,431,618 | 2/1984 | Boward, Jr. et al. | 423/242 |
| 4,459,275 | 7/1984 | Seike et al. | 423/569 |
| 4,533,531 | 8/1985 | Shinoda et al. | 423/242 |
| 4,587,112 | 5/1986 | Kim | 423/242 |
| 4,762,796 | 8/1988 | Weber et al. | 436/55 |
| 5,008,203 | 4/1991 | Mathews | 436/55 |

Primary Examiner—James C. Housel
Assistant Examiner—Long V. Le
Attorney, Agent, or Firm—Vytas R. Matas; Robert J. Edwards; Daniel S. Kalka

[57] ABSTRACT

A method and apparatus for operating a limestone wet scrubbing flue gas desulfurization apparatus comprises first and second pH measuring devices connected respectively to a recirculation line in the scrubber and above the liquid holdup tray in the scrubber. The difference in the pH values measured at these two locations in the system is used to adjust the amount of air supplied to the sump or reaction tank of the scrubber to maximize oxidation in the scrubber and to avoid wasted airflow.

7 Claims, 3 Drawing Sheets

FORCED OXIDATION MONITORING AND CONTROL SYSTEM

FIELD AND BACKGROUND OF THE INVENTION

The present invention relates to wet scrubbers, and in particular to a new and useful technique for monitoring and controlling forced oxidation in a wet scrubber.

In situ, forced oxidation is a process used in limestone wet scrubbing Flue Gas Desulfurization (FGD) to produce a waste that is primarily gypsum. This process involves the introduction of compressed air into a wet scrubber slurry reaction tank to provide sufficient oxygen for the formation of gypsum. The chemical name for gypsum is calcium sulfate dihydrate ($CaSO_4 * 2H_2O$). If air is not added to the wet scrubber, then significant amounts of calcium sulfite hemihydrate ($CaSO_3 * 1/2 H_2O$) will form and result in a waste that is more difficult to dispose of. Limestone wet scrubbers chemically react a mixture of finely ground limestone and water with sulfur dioxide to produce a solid waste product.

In situ, forced oxidation is widely used in limestone wet scrubbers in the electric utility power generation industry. To produce a commercial grade gypsum product, sufficient compressed air must be added to the wet scrubber to maintain the oxidation above 99%. Oxidation is measured by chemically analyzing the wet scrubber slurry for sulfite ($SO_3=$) and sulfate ($SO_4=$). percent oxidation is expressed as the molar ratio of sulfate to total sulfur species:

$$\% \text{ Oxidation} = \frac{100 * (SO_4=)}{(SO_4=) + (SO_3=)}$$

The current method of controlling oxidation is to obtain a sample and conduct a chemical analysis. Typically, the results of the chemical analyses are completed on the same day that the sample was obtained. There is no real time measurement to indicate loss of gypsum production used in prior art FGD systems.

The current method of controlling oxidation is to operate the compressed air supply system at full capacity during all periods of wet scrubber operation. In other words, the oxidation air flow is not controlled, but maintained at the design flow rate. This control method, while ensuring that sufficient compressed air is added even under the most extreme design operating conditions, wastes energy in the form of compressor power under all other operating conditions.

During process upsets, which may not be discovered until several hours after they begin, the highest air flow possible is used to recover from the upset. Until high oxidation occurs, the solid product quality would be unacceptable and must be kept separate from the quality gypsum. Otherwise, the unacceptable quality waste may adversely affect the handling and value of the quality gypsum. The unacceptable quality waste can be disposed of, but this involves additional cost and handling.

SUMMARY OF THE INVENTION

The present invention includes a method that provides a continuous, indirect measurement of oxidation in an in situ forced oxidation wet scrubber. The method directly measures the pH of the absorber recirculating slurry and the pH of the absorber tray slurry. When oxidation is low, the absorber slurry will contain a significant amount of dissolved bisulfite ($HSO_3-$). The bisulfite buffers the absorber tray slurry, thus raising the tray pH. A condensed description of this buffering effect is that when oxidation is high, there is no significant bisulfite (buffer) present and the tray pH is suppressed while sulfur dioxide is absorbed into the liquid portion of the tray slurry.

The present invention monitors the difference in pH between the absorber recirculating slurry and the absorber tray slurry and uses this difference to control the flow of compressed air to the wet scrubber. Experimental tests conducted at a 55 megawatt power plant indicate that there is a quantitative relationship between oxidation and tray pH suppression. The control system is used to increase the compressed air flow rate when the tray pH suppression is below a specified value.

Accordingly, an objective of the present invention is to provide a method of operating a wet scrubber in order to maximize the usefulness of compressed air and minimize the supply of compressed air to the scrubber when not necessary. This is done by measuring the difference between the tray pH and the recirculating slurry pH and using this measurement as an indication of the oxidation level taking place in the scrubber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
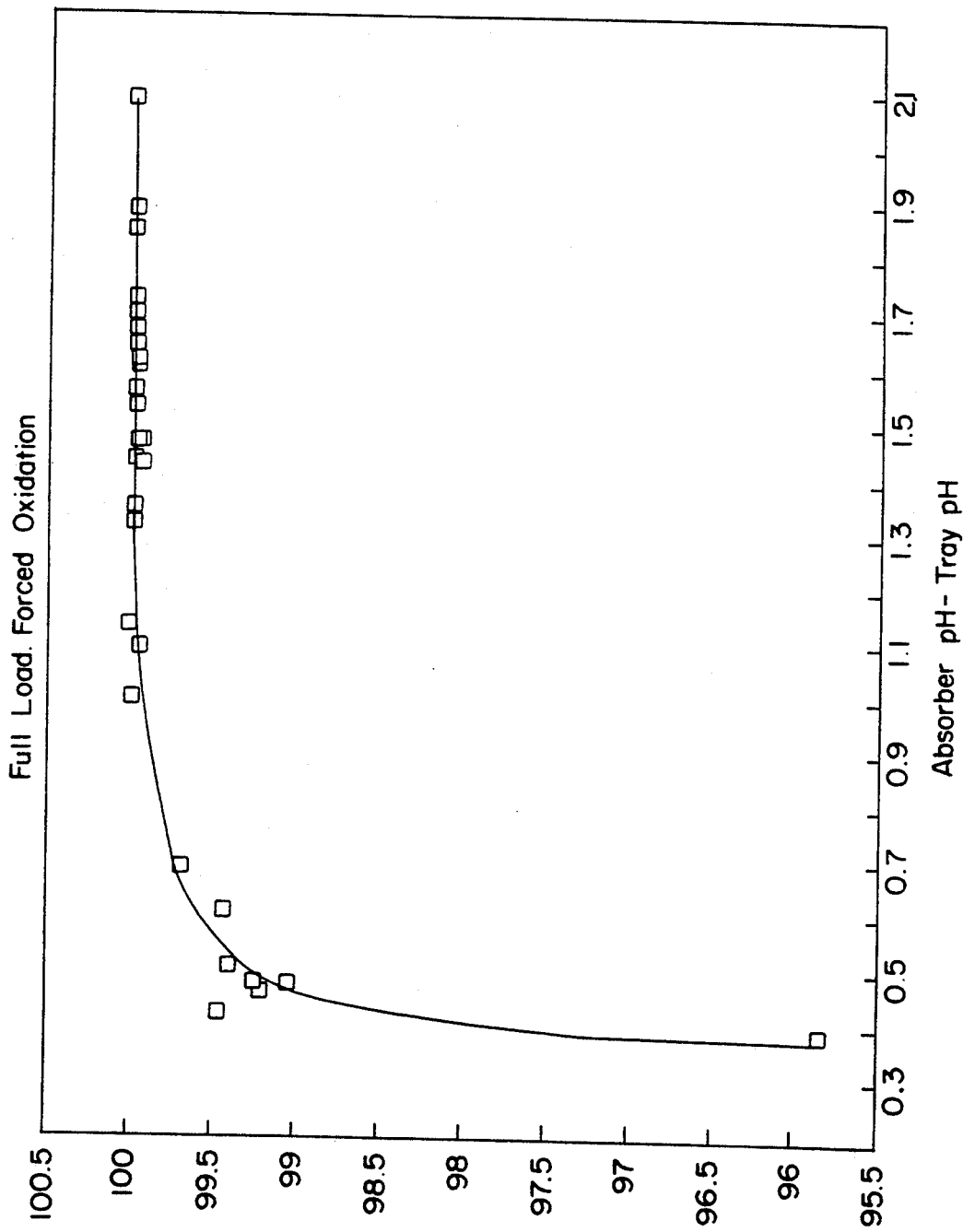
FIG. 1 is a graph plotting the difference between absorber pH and tray pH in a wet scrubber, against the oxidation percentage in the scrubber.

Referring to the drawings in particular, the invention embodied therein comprises a method and arrangement for monitoring and controlling forced oxidation in a wet scrubber.

FIG. 1 illustrates experimental tests which were conducted on a 55 megawatt power plant with a tray type flue gas desulfurization (FGD) system. The abscissa is the difference between absorber recirculating slurry pH and tray pH in the wet scrubber of the power plant. This is plotted against the percentage of forced oxidation in the scrubber. FIG. 1 illustrates the predictable and repeatable relationship between the difference value and the oxidation percentage which can be used to control the compressed air flow to the scrubber when the percentage drops off.

Figure 2:
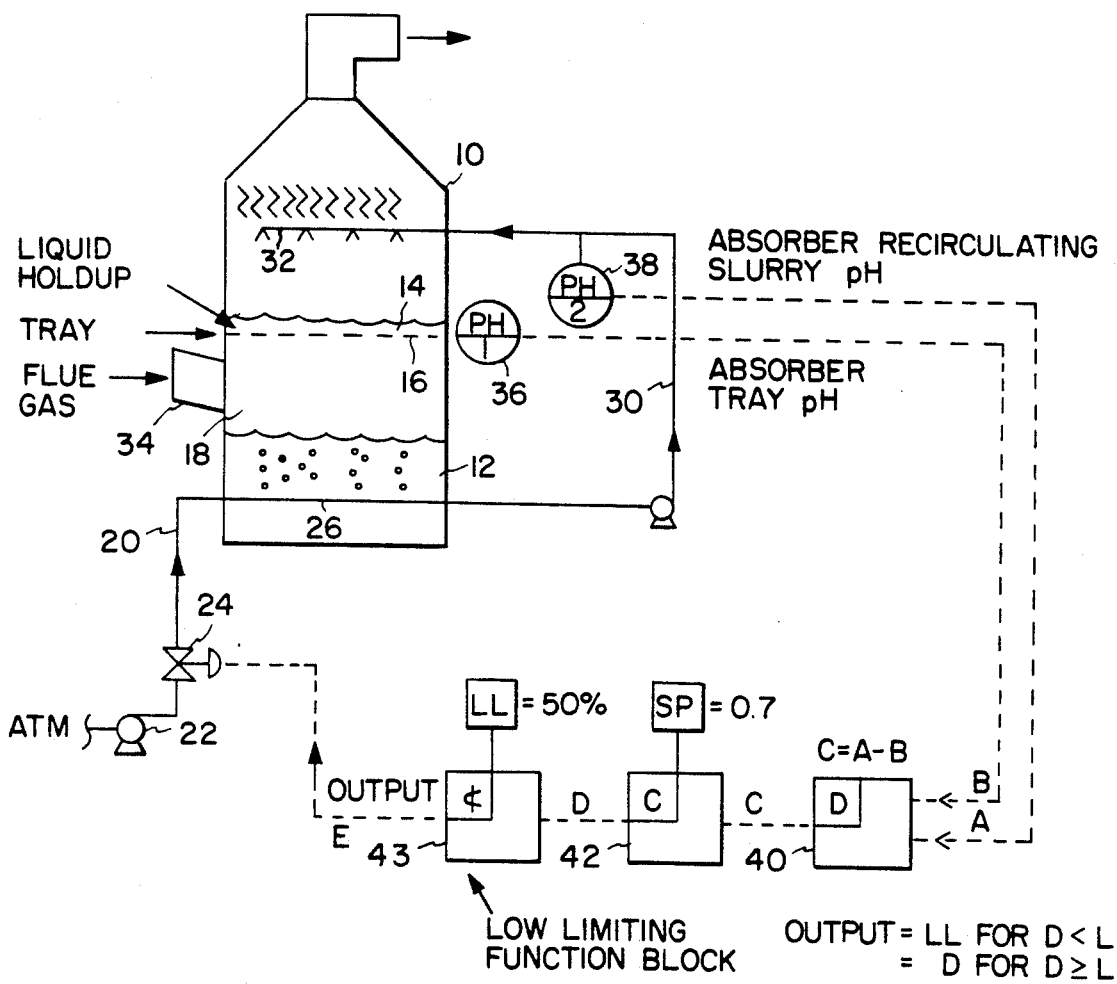
FIG. 2 is a schematic block diagram showing an apparatus used to practice one embodiment of the invention.
Figure 4:
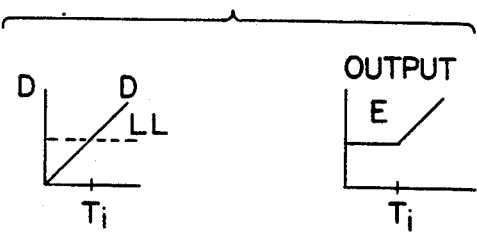
FIG. 4 is a composite set of graphs for the output signal D and the output signal E plotted against time and for the system illustrated in FIG. 2.

A feedback control diagram according to one embodiment of the invention, is shown in FIG. 2.

A flow of compressed air on a line (20) by a compressor pump (22) and through a valve (24), is controlled to maintain a minimum tray slurry pH suppression. The compressed air is supplied to a distribution pipe (26) into the slurry in the sump or reaction tank (12) of an absorber or wet scrubber (10). Slurry is recycled through a recirculating line (30) from the slurry sump to a spraying assembly (32) in the upper part of the scrubber (10). Recycled slurry is sprayed down into a liquid holdup area (14) above a tray (16). Flue gas is supplied through a flue gas inlet (34) to the area (18) of the scrubber above sump (12) and below tray (16).

A first pH monitor (36) communicates with the liquid in holdup area (14) and a second pH monitor (38) communicates with slurry in the recirculating line (30) for providing real-time pH measurements at these two locations.

The absorber recirculation slurry pH measurements A and absorber tray slurry pH measurements B are transmitted to a difference function block (40) where the tray pH suppression C (A−B=C) is calculated. A controller (42) compares the tray pH suppression to the tray pH suppression set point (e.g. SP=0.7) and provides an output signal D of 0%-100% to a lower limit function block (43). The lower limit function block (43) monitors the output of the controller (42) and has a low limit set point (e.g. 50%). The low limit set point ensures that the compressed air flow control valve (24) does not go below a minimum open position. The purpose of the low limit is to ensure that air flow is always maintained to the oxidation air distribution pipe system (26) to prevent absorber recirculation slurry from flowing back into the distribution piping (26) and possibly plugging this system. The lower limit function block output signal E is transmitted to the compressed air flow control valve (24).

Figure 3:
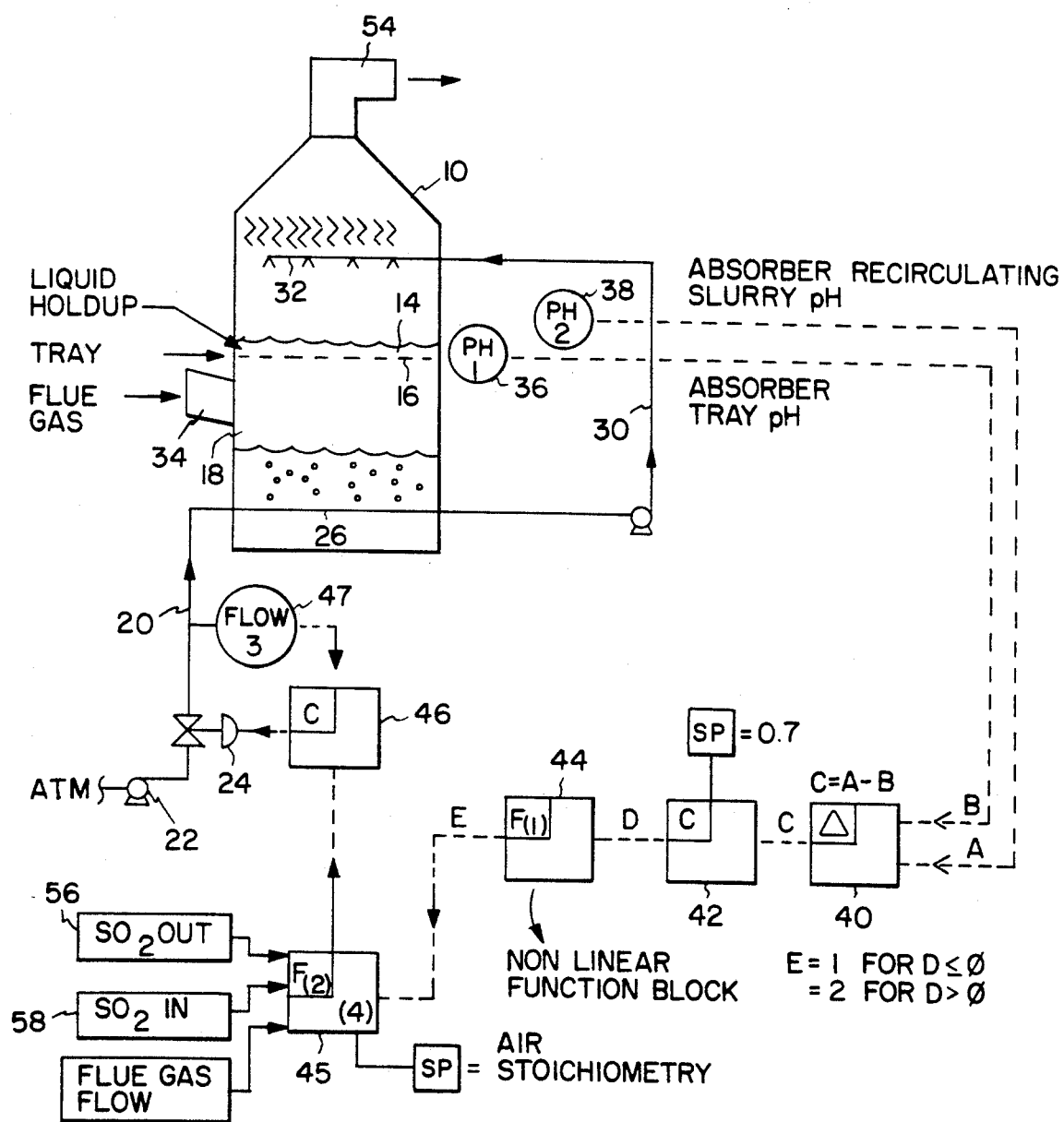
FIG. 3 is a schematic block diagram of an apparatus used to practice another embodiment of the invention.
Figure 5:
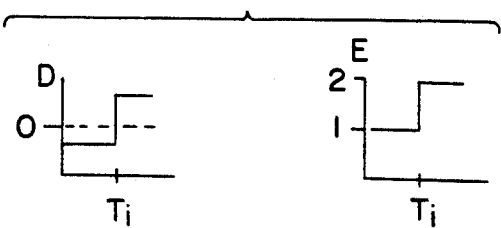
FIG. 5 is a view similar to FIG. 4 but for the system of FIG. 3.

A feedforward-feedback control diagram according to a second embodiment of the invention is shown in FIG. 3. In FIG. 3, the same reference numerals and letters are used to designate the same or similar functional parts or signals.

The air stoichiometry is the ratio of the moles of oxygen atoms introduced into the wet scrubber to the moles of sulfur dioxide removed from the flue gas passing through the wet scrubber. The moles of oxygen introduced into the wet scrubber are determined from the amount of compressed air added to the wet scrubber at (26) using a flow meter (47). The moles of sulfur removed from the flue gas passing through the wet scrubber are determined from the amount of flue gas entering the wet scrubber using a monitor (52) and the sulfur dioxide concentrations in the flue gas entering (58) and leaving (56) the wet scrubber.

The amount of compressed air added to the wet scrubber is controlled to maintain a predetermined air stoichiometry. The absorber recirculation slurry at (30) and absorber tray slurry (14) pH measurements A and B are transmitted to a difference function block (40) where the tray pH suppression is calculated. The tray pH suppression C is compared to a set point in a difference function block (42). The output D of this difference block (42) is transmitted to a non-linear function block (44). The non-linear function block (44) sends a value of 1 or 2 to the multiplier function block (45). If the tray pH suppression is greater than the set point, then the air stoichiometry is maintained by an air flow controller (46) at the air stoichiometry set point. If the tray pH suppression is less than the set point value, then the air stoichiometry is maintained by the air flow controller (46) at a value higher than the air stoichiometry set point (e.g. 1.5 times). The flow meter (47) is used with controller (46).

The system of the invention can also be controlled with a prior art process with no feedback control. The pH suppression is determined by comparing the tray pH to the absorber slurry pH, and if the tray pH suppression is less than the set point, an alarm is energized. The alarm requests the operator to evaluate and correct any process problems.

Use of the forced oxidation monitoring and control system described above provides the following advantages:

a) The quantity of compressed air required to maintain oxidation can be reduced, thus reducing operating costs.

b) The compressed air pressure required to maintain oxidation can be reduced, thus reducing operating costs.

c) The tray pH suppression can be used to continuously monitor whether oxidation is acceptable. The process operator can use this information to maintain the wet scrubber at acceptable operating conditions without relying on wet chemical analyses of grab samples.

d) An early indication of process problems is provided allowing for control or operator compensation. The result is a more consistent gypsum product and less unacceptable waste product that may have higher disposal costs.

e) The invention can be applied to FGD systems that use any mass transfer device such as packing and to FGD systems that use the open, spray tower design. These applications require that a continuous measurement of slurry pH in the lower reaction zone of the absorber tower be substituted for the tray pH.

While the specific embodiments of the invention have been shown and described in detail to illustrate the application of the principles of the invention, it will be understood that the invention may be embodied otherwise without departing from such principles.

We claim:

1. A method of providing an indication of oxidation percentage in a wet scrubber comprising supplying air into the scrubber, supplying flue gas through a flue gas inlet to the scrubber from which sulfur is to be removed, spraying an absorber slurry from above the flue gas inlet down into a sump or reaction tank below the flue gas inlet, recirculating the slurry from the sump to the spray through a recirculating line, the method further comprising the steps of:

measuring the pH of the slurry in the recirculating line to obtain a first pH measurement;

measuring the pH of the slurry above the flue gas inlet to obtain a second pH measurement;

calculating the difference between the first and second pH measurements; and using the difference as an indication of oxidation percentage taking Place within the scrubber.

2. A method according to claim 1, including determining whether the difference is below a selected set point, and, when the difference is below the selected set point, activating an alarm.

3. A method according to claim 1, including supplying air to the sump of the absorber at a flow rate to maximize oxidation in the absorber, and controlling the flow of air according to the difference between the first and second pH measurements to maintain efficient use of the air supply.

4. A method according to claim 3, including measuring a sulfur oxide content in the flue gas being supplied to the scrubber, measuring the sulfur oxide content of gas leaving the scrubber, measuring the flow rate of the flue gas entering the scrubber, establishing a set point for stoichiometric air needed to oxidize the sulfur oxide absorbed in the absorber and using the stoichiometric set point along with the difference between the first and second pH measurements to control the flow of air supplied to the scrubber.

5. An apparatus for indicating a level of oxidation percentage within a wet scrubber having an air supply line, a recirculating line for recirculating a slurry from a lower portion of the scrubber to a spray device in an upper portion of the scrubber, a flue gas inlet for supplying flue gas into the scrubber intermediate, said lower and upper portions the apparatus comprising:
  first pH measuring means for measuring the pH of slurry in the recirculating line;
  second pH measuring means for measuring the pH of the slurry in the upper portion; and
  difference calculating means connected to the first and second pH measuring means for generating a difference value between the first and second pH measurements, the difference value being usable for indicating a level of oxidation percentage within the scrubber.

6. An apparatus according to claim 5, including an air supply line connected to the lower portion end of the scrubber for supplying compressed air to slurry in the lower portion end of the scrubber, valve means in the air supply line for controlling a flow of air to the scrubber, and set point means connected between the means for calculating the difference between the first and second pH measurements, and the valve means, for controlling the flow of air into the scrubber according to the difference value.

7. An apparatus according to claim 6, including flow measuring means connected to the air supply line for measuring the flow of air, a controller connected to the valve means and to the flow measuring means for controlling the position of the valve means according to a function, the set point means including means for determining stoichiometric air needed for full oxidation in the scrubber, the set point means being connected between the controller and the difference means for controlling the position of the valve means according to the stoichiometric air needed and according to the difference value.

* * * * *